US012696312B2

(12) United States Patent
Yue et al.

(10) Patent No.: US 12,696,312 B2
(45) Date of Patent: Jul. 28, 2026

(54) METHODS, APPARATUSES, AND MEDIA FOR INDICATING LISTEN BEFORE TALK FAILURE

(71) Applicant: LENOVO (BEIJING) LIMITED, Beijing (CN)

(72) Inventors: Ran Yue, Beijing (CN); Mingzeng Dai, Beijing (CN); Lianhai Wu, Beijing (CN); Jing Han, Beijing (CN); Jie Shi, Beijing (CN); Yuantao Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 454 days.

(21) Appl. No.: 18/260,148

(22) PCT Filed: Dec. 30, 2020

(86) PCT No.: PCT/CN2020/141485
§ 371 (c)(1),
(2) Date: Jun. 30, 2023

(87) PCT Pub. No.: WO2022/141218
PCT Pub. Date: Jul. 7, 2022

(65) Prior Publication Data
US 2024/0064801 A1 Feb. 22, 2024

(51) Int. Cl.
*H04W 74/0808* (2024.01)
*H04W 74/00* (2009.01)
*H04W 76/27* (2018.01)

(52) U.S. Cl.
CPC ..... *H04W 74/0808* (2013.01); *H04W 74/004* (2013.01); *H04W 76/27* (2018.02)

(58) Field of Classification Search
CPC ........... H04W 74/004; H04W 74/0808; H04W 76/19; H04W 76/27
See application file for complete search history.

(56) References Cited

U.S. PATENT DOCUMENTS

| | | | |
|---|---|---|---|
| 2015/0208350 A1* | 7/2015 | Li | H04W 74/02 |
| | | | 370/336 |
| 2021/0112592 A1* | 4/2021 | Lee | H04W 16/14 |

(Continued)

FOREIGN PATENT DOCUMENTS

| | | |
|---|---|---|
| CN | 110856276 A | 2/2020 |
| WO | 2019031796 A1 | 2/2019 |
| WO | 2020098691 A1 | 5/2020 |

OTHER PUBLICATIONS

InterDigital, "Summary of RACH and UL LBT Failure", 3GPP RAN WG2 Meeting #109-e, No. R2-2001911, Mar. 6, 2020, pp. 1-41.

(Continued)

*Primary Examiner* — Kashif Siddiqui
(74) *Attorney, Agent, or Firm* — AMPACC Law Group, PLLC

(57) ABSTRACT

Embodiments of the present disclosure relate to methods, apparatuses, and media for indicating Listen Before Talk (LBT) failure. A method performed by a terminal device comprises determining whether at least one consistent Listen Before Talk, LBT, failure is triggered on a set of resources associated with a data transmission between a network device and the terminal device in Radio Resource Control (RRC) non-connected state; in accordance with a determination that at least one consistent LBT failure is triggered, generating an indication of the at least one consistent LBT failure for the data transmission in the RRC non-connected state; and transmitting the indication to the network device. In this way, the format and signaling of consistent LBT failure indication for data transmission in the RRC non-connected state is designed and the transmission of the indication can be performed in various state of the terminal device. Meanwhile, the scheme of the cancellation mecha- (Continued)

400

410
GENERATE INDICATION OF AT LEAST ONE CONSISTENT LBT FAILURE FOR DATA TRANSMISSION IN RRC NON-CONNECTED STATE

420
TRANSMIT INDICATION TO THE NETWORK DEVICE nisms for the triggered consistent LBT failure for SDT is also proposed.

18 Claims, 3 Drawing Sheets

(56) References Cited

U.S. PATENT DOCUMENTS

| | | | | |
|---|---|---|---|---|
| 2022/0400396 | A1* | 12/2022 | Alfarhan ............... | H04W 72/20 |
| 2023/0007686 | A1* | 1/2023 | Belleschi .......... | H04W 74/0808 |
| 2024/0032134 | A1* | 1/2024 | Kim ...................... | H04W 76/20 |

OTHER PUBLICATIONS

International Search Report and Written Opinion dated Sep. 28, 2021 for International Application No. PCT /CN2020/141485.

* cited by examiner

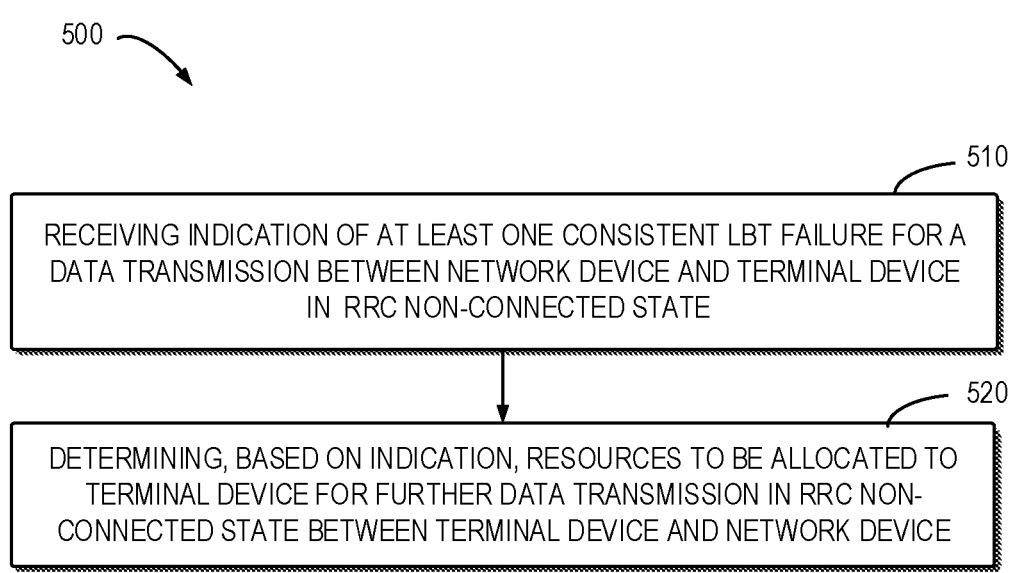

500

510

RECEIVING INDICATION OF AT LEAST ONE CONSISTENT LBT FAILURE FOR A DATA TRANSMISSION BETWEEN NETWORK DEVICE AND TERMINAL DEVICE IN RRC NON-CONNECTED STATE

520

DETERMINING, BASED ON INDICATION, RESOURCES TO BE ALLOCATED TO TERMINAL DEVICE FOR FURTHER DATA TRANSMISSION IN RRC NON-CONNECTED STATE BETWEEN TERMINAL DEVICE AND NETWORK DEVICE

FIG. 5

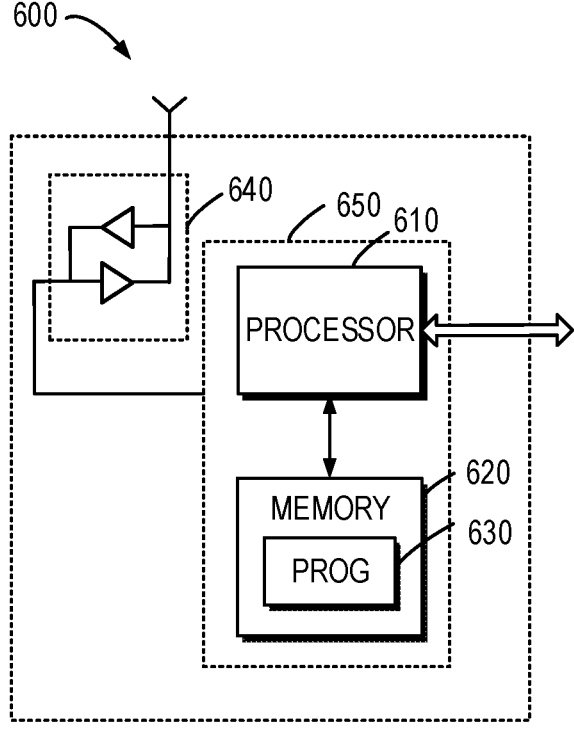

600

640   650  610

PROCESSOR

620

MEMORY   630

PROG

FIG. 6

METHODS, APPARATUSES, AND MEDIA FOR INDICATING LISTEN BEFORE TALK FAILURE

CROSS REFERENCE TO RELATED APPLICATIONS

This application is a national phase entry of International Application No. PCT/CN2020/141485 filed Dec. 30, 2020, which is incorporated by reference in its entirety.

TECHNICAL FIELD

Embodiments of the present disclosure generally relate to the field of telecommunication, and in particular, to methods, apparatuses, and media for indicating Listen Before Talk (LBT) failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. These multiple access technologies have been adopted in various telecommunication standards to provide a common protocol that enables different wireless devices to communicate on a municipal, national, regional, and even global level. An example of an emerging telecommunication standard is New Radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services and making use of new spectrum as well as support beamforming, multiple-input multiple-output (MIMO) antenna technology, and carrier aggregation.

The NR operation in unlicensed bands relies on the transmitting device sensing the radio resources before commencing transmission. This technique is known as Listen Before Talk (LBT). For the connected state of User Equipments (UEs), it was decided to apply a mechanism 'consistent LBT failure recovery' to handle the case when Uplink (UL) LBT fails successively that is beneficial from the perspective of transmission performance. A Media Access Control-Control Element (MAC CE) was introduced to indicate the detection of consistent LTL LBT failures to the network in NR-based Access to Unlicensed Spectrum (NR-U).

SUMMARY

In general, example embodiments of the present disclosure provide a solution for indicating LBT failure.

In a first aspect, there is provided a method performed by a terminal device. The method comprises determining whether at least one consistent LBT failure is triggered on a set of resources associated with a data transmission between a network device and the terminal device in RRC non-connected state; in accordance with a determination that at least one consistent LBT failure is triggered, generating an indication of the at least one consistent LBT failure for the data transmission in the RRC non-connected state; and transmitting the indication to the network device.

In a second aspect, there is provided a method performed by a network device. The method comprises receiving, from a terminal device in RRC non-connected state, an indication of at least one consistent LBT failure for a data transmission between the terminal device and the network device; and determining, based on the indication, resources to be allocated to the terminal device for a further data transmission in the RRC non-connected state between the terminal device and the network device.

In a third aspect, there is provided an apparatus. The apparatus includes a processor; and a memory coupled to the processor and storing instructions thereon, the instructions, when executed by the processor, causing the apparatus to perform the method according to the first aspect.

In a fourth aspect, there is provided an apparatus. The apparatus includes a processor; and a memory coupled to the processor and storing instructions thereon, the instructions, when executed by the processor, causing the apparatus to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 5 illustrates a flowchart of an example method according to some embodiments of the present disclosure;

FIG. 6 is a simplified block diagram of an apparatus that is suitable for implementing embodiments of the present disclosure.

Throughout the drawings, the same or similar reference numerals represent the same or similar element.

DETAILED DESCRIPTION

Figure 1:
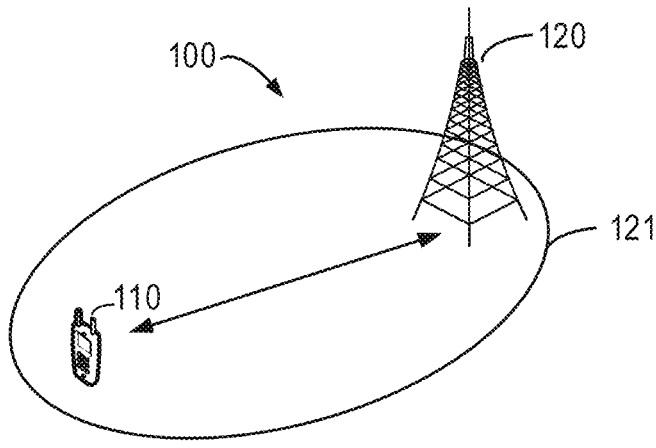
FIG. 1 is a block diagram of a communication system in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communication discussed herein may conform to any suitable wireless interface standards including, but not limited to, New Radio Access (NR), NR-U, Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, such communication may be performed according to any communication protocol either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Reference to an element in the singular is not intended to mean "one and only one" unless explicitly so stated, but rather is intended to mean "one or more." Where a phrase similar to "any combination of A, B, C" is used herein, it is intended that the phrase be interpreted to mean that A alone can be present in an embodiment, B alone can be present in an embodiment, C alone can be present in an embodiment, and that any combination of the elements A, B, and C can be present in a single embodiment. For example, any combination of the elements A, B, and C includes the combinations of A and B, A and C, B and C, and A and B and C can each be present in an embodiment.

When elements, such as A and B, are described as being "A/B" or a "T" is used, then the description is intended to cover all the following combinations: A alone, B alone, or A and B together.

In a LBT procedure, if the number of LBT failures reaches a threshold, the "consistent LBT failure" can be triggered. As mentioned above, for the connected state of UEs, the mechanism "consistent LBT failure recovery" can be used when UL LBT fails successively. The MAC CE has been introduced to indicate the detection of consistent UL LBT failures to the network in NR-U. The MAC CE can indicate the consistent UL LBT failures per Secondary Cell (SCell).

The solutions for the licensed carriers can also be reused for NR-U if applicable. Thus, it is also beneficial to introduce a mechanism for handling of consistent LBT failure when Small Data Transmission (SDT) is performed.

Currently, it is more likely that the UE performs SDT on one serving cell, for example, Primary (PCell) or Secondary Primary Cell (SpCell), rather than on multiple serving cells. However, the issue of indicating the consistent LBT failure has not been solved.

In the conventional way, the LBT failure can be indicated by MAC CE. For example, the LBT failure MAC CE of one octet can be used and identified by a MAC subheader with Logical Channel Identifier (LCID). It has a fixed size and consists of a single octet containing 8 C-fields. On the other hand, the LBT failure MAC CE of four octets can also be used and identified by a MAC subheader with LCID. It has a fixed size and consists of four octets containing 32 C-fields. A single octet format is used when the highest ServCellIndex of a SCell of a MAC entity, for which LBT failure can be detected, is less than 8, otherwise four octets format can be used. Furthermore, if there is a serving Cell configured for the MAC entity with SenCellIndex i and if consistent LBT failure have been triggered and not cancelled in this serving Cell, the corresponding field within the octet of the LBT failure MAC CE is set to "1", otherwise such field is set to "0".

The legacy indication of LBT failure within the LBT failure MAC CE was implemented by assigning each field of the LBT failure MAC CE octet per SCell. If such indication is reused for SDT in NR-U, most of the fields of a bitmap in the LBT failure MAC CE may be wasted, because all the resources for SDT can be configured only for one serving cell. Since the SDT could be performed only on pre-configured UL resources or Message A (MsgA) Physical Uplink Shared Channel (PUSCH) or Message 3 (Msg3), the LBT failure indication for SDT after the consistent LBT failure was triggered can be finer granularity compared with the legacy indication and the network can make better configuration for the subsequent SDT based on such indication.

In addition, the purpose of the LBT failure indication for SDT is to provide information to the network that resources configured for SDT are consistently busy. Only if the indication can be transmitted to the network, the consistently busy state associated with such resources can be considered as recovered. Although the SDT can occur in an RRC non-connected state, it is not necessary to restrict a state in which the transmission of the indication can performed. Thus, the behaviour associated with transmission of the indication in both RRC non-connected state and RRC connected state can be discussed.

If the consistent LBT failure has been triggered, and not cancelled, it means the consistent LBT failure has not been recovered. In order to transmit small data, the related cancellation rules should be specified. As analyzed above, only if the indication can be transmitted to the network, the consistently busy state can be considered as recovered and therefore the triggered consistent LBT failure for SDT can be cancelled.

Therefore, embodiments of the present disclosure provide a solution for indicating the occurrence of a consistent LBT failure. According to embodiments of the present disclosure, for example, the terminal device in the RRC non-connected state can perform multiple LBT procedures. If the number of the LBT failures reaches a threshold number, the consistent LBT failure can be triggered. If the terminal device determines that the consistent LBT failure has been triggered, the terminal device can generate an indication of the consistent LBT failure for the data transmission in the RRC non-connected state, especially for SDT. Then the terminal device can transmit the generated indication to the network device. The network device can reconfigure resources for the SDT based on the indication received.

Some example embodiments of the present disclosure will be described in detail below with reference to FIGS. 1-7.

Example Environment

FIG. 1 illustrates a communication system 100 in which example embodiments of the present disclosure can be implemented. The communication system 100 includes a terminal device 110 and a network device 120. The network device 120 is associated with one or more serving areas, i.e. a land area called "cells". As shown in FIG. 1, the network device 120 may serve a cell 121.

In the communication system 100, the network device 120 and the terminal device 110 can communicate data and control information to each other. It is to be understood that the number of network devices, terminal devices and/or cells is provided for illustration purpose only without suggesting any limitation to the scope of the present disclosure. The communication system 100 may include any suitable number of network devices, terminal devices and/or cells adapted for implementing the present disclosure.

If the terminal device 110 intends to initial an uplink transmission to the network device 120, the terminal device 110 can perform a LBT procedure to determine whether the uplink resource is available. If the LBT procedure is successfully performed, the terminal device 110 can transmit the data to the network device. If the LBT procedure fails, the terminal device 110 can generate an indication of the LBT failure and transmit the indication to the network device 120 to indicating on which resource(s) the LBT failure has occurred. Then the network device 120 can reconfigure the UL resource(s) to the terminal device 110 based on the indication received.

Transmission of information in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, such communication protocol(s) may further utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Example Processes

Figure 2:
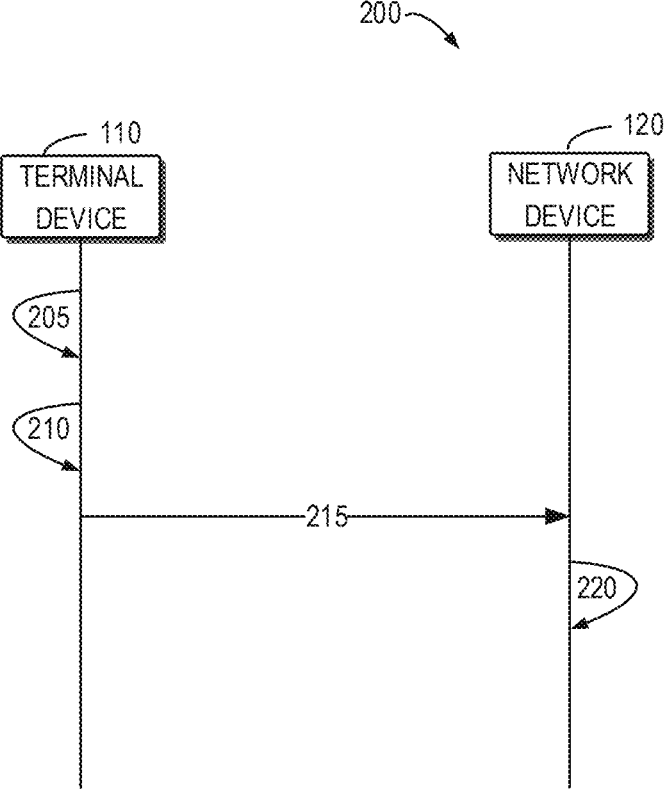
FIG. 2 illustrates a signaling chart demonstrating an example process for indicating a consistent LBT failure according to some embodiments of the present disclosure.

Some example processes for indicating a consistent LBT failure will be described in detail below. Reference is now made to FIG. 2. FIG. 2 illustrates a signaling chart demonstrating an example process 200 for indicating a consistent LBT failure according to some embodiments of the present disclosure. For the purpose of this discussion, the process 200 will be described with reference to FIG. 1. The process 200 may involve the terminal device 110 and the network device 120 as illustrated in FIG. 1.

As shown in FIG. 2, in the process 200, when the terminal device 110 is in RRC non-connected state, if there is data to be transmitted from the terminal device 110 to the network device 120, the terminal device 110 can perform a LBT procedure to detect whether a UL resource can be used for data transmission. If the number of LBT failures associated with the performed LBT procedure reaches or exceeds a predetermined threshold number, the terminal device 110 may determine 205 that a consistent LBT failure has been triggered on some or all assigned UL resources. Upon determining that at least one consistent LBT failure was triggered, the terminal device 110 can generates 210 an indication of the at least one consistent LBT failure for the data transmission in the RRC non-connected state. Hereinafter the term "data transmission in the RRC non-connected state" can also be referred to as SDT.

In an exemplary embodiment, the indication of a consistent LBT failure(s) can be represented in a MAC CE as a bitmap representing resource(s) the consistent LBT failure was triggered for. For example, the terminal device 110 can determine a set of resources associated with the data transmission in RRC non-connected state. The set of resources can be considered as a set of pre-configured resources (hereinafter can also be referred to as configured grant) allocated for the terminal device 110 to initiate the data transmission. The set of resources can also be considered as resources associated with a Random Access Channel (RACH) procedure for the data transmission, such as a set of transmission occasions, messages specified for RACH, for example, MSGA or MSG3, or specific channel.

Then, the terminal device 110 can determine a subset of resources on which the consistent LBT failure was triggered from the set of resources associated with the data transmission in RRC non-connected state and generate the indication of consistent LBT failure(s) based on the determined subset of the resources.

In an exemplary embodiment, in a case where the set of resources refer to configured grants, the LBT failure MAC CE for SDT can be identified by a MAC subheader with a specific LCID. The LBT failure MAC CE can consist of one or more octets, for example, one octet, two octets, . . . , four octets and each of these octets can be identified by a MAC subheader with a specific LCID, with a single octet containing 8 CG-fields, or more octets containing 16, . . . , or 32 C-fields. A single octet format is used when the highest CGIndex of a pre-configured grant of a MAC entity for which the LBT failure is detected is less than 8, otherwise more octets format can be used.

If there is a pre-configured resource configured for SDT with CGIndex i and if consistent LBT failure have been triggered and not cancelled for this pre-configured resource, the corresponding field within the octet of the LBT failure MAC CE associated with this resource is set to "1", otherwise such field is set to "0".

Figure 3A:
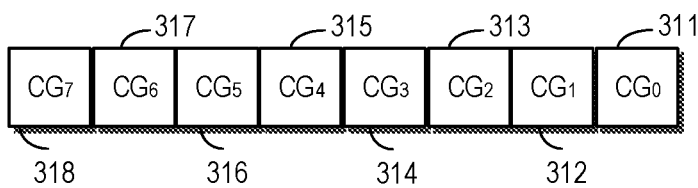
FIGS. 3A and 3B illustrate example formats for indicating a consistent LBT failure according to some embodiments of the present disclosure.

FIG. 3A illustrates an exemplary consistent LBT failure indication in a MAC CE format according to some embodiments of the present disclosure. As shown in FIG. 3A, the fields contained in a single octet can corresponds to 8 CG-fields representing a bitmap, namely $CG_0$-$CG_7$ (shown by block 311-318), which can be considered to map to a set of resources associated with the data transmission in the RRC non-connected state. For example, if the terminal device 110 determines that a consistent LBT failure was triggered on resources associated with $CG_1$, $CG_4$ and $CG_7$ fields of the LBT failure MAC CE octet, then the terminal device 110 can generate a bitmap in which bit values corresponding to the CG-fields: $CG_1$, $CG_4$ and $CG_7$, will be set to "1" and other bit values will be set to "0". If, on the other hand, there is no pre-configured resource being mapped to one or more fields of the bitmap, the corresponding field can be simply ignored. For example, there are 8 CG-fields contained in a single octet and pre-configured resources are being mapped to only five of the 8 CG-fields, then the remaining 3 fields that have no pre-configured resources mapped to them can be ignored.

Figure 3B:
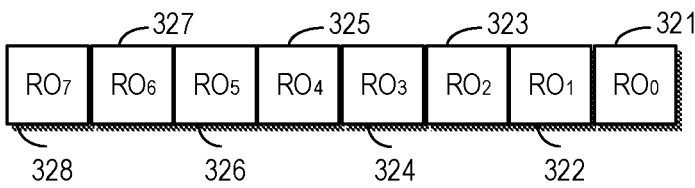

Alternatively, instead of the CG index being associated with corresponding fields in the generated bitmap, the Physical Random Access Channel (PRACH) configuration index or RACH occasion (RO) index for SDT can also be used when generating a bitmap carrying an indication of the at least one consistent LBT failure being detected. FIG. 3B illustrates another example of such alternative format for indicating a consistent LBT failure according to some embodiments of the present disclosure. As shown in FIG. 3B, the fields contained in a single octet can corresponds to 8 ROs, namely $RO_0$-$RO_7$ (shown by block 321-328), which can be mapped to a set of resources associated with the SDT. The RO index can be configured with a pre-defined mapping relationship. For example, the bit order of each RO field within a LBT failure MAC CE is represented with the highest PRACH configuration index in the leftmost bit and the lowest PRACH configuration index in the rightmost bit.

Furthermore, instead of the CG index being associated with corresponding fields in the generated bitmap, the MsgA PUSCH index for SDT can also be used when generating a bitmap carrying an indication of the at least one consistent LBT failure being detected. For example, MsgA PUSCH group A or MsgA PUSCH group B. Furthermore, the CG index in the bitmap can also be the combination of the resources. The mapping relation between each bit and resource can be configured or pre-defined, for example, it could be the CG index prior to the MsgA PUSCH index. For example, the fields of the LBT failure MAC CE bitmap can be associated with different indices. It could be that bit 7-5 are associated with RO indices and bit 4-0 are associated with CG indices.

In addition, the indication of the at least one consistent LBT failure for SDT can also be represented as a signaling by transmitting a RRC message or PDCCH indication. The terminal device 110 can generate the signaling, which can directly indicate the LBT failure for SDT or a consistent LBT failure for SDT once triggered on the UL resource and not cancelled. Similar with the indication in a MAC CE format case illustrated in paragraph [0048], the UL resource can be one or multiple pre-configured resources or PRACH configuration or RO or MsgA PUSCH or Msg3 resource or the combination of the resources assigned for SDT.

Reference is now made to FIG. 2. After generating the indication of the at least one consistent LBT failure for SDT, the terminal device 110 transmit 215 the indication to the network device 120.

In an exemplary embodiment, the indication of at least one consistent LBT failure for SDT can be transmitted when the terminal device 110 is in RRC_INACTIVE state. As another option, the indication of the at least one consistent LBT failure for SDT can be transmitted when the terminal device 110 is in RRC_CONNECTED state.

In an exemplary embodiment, the indication can be transmitted to the network device 120 independent of other data. As another option, the indication can also be transmitted to the network device 120 via an RRC message or multiplexed with data.

In an exemplary embodiment, when an indication of consistent LBT failure is to be transmitted, a SDT can be initiated. It is to be understood that the indication can be transmitted immediately once the SDT is initiated or at any point in time after the SDT is initiated. After the SDT is initiated, either in a RRC_INACTIVE or RRC_IDLE states, the indication can be transmitted independent of other data. Alternatively, the indication can be transmitted via an RRC message. As another option, the indication can be transmitted by a specific Logical Channel Identifier (LCD). It is also possible that the indication can be transmitted together with data.

In an exemplary embodiment, when the indication is to be transmitted, a RACH procedure can be initiated. After the RACH procedure is initiated in a RRC_INACTIVE or RRC_IDLE state, the indication can be transmitted via a MSG3. It is to be understood that the indication can be transmitted immediately once the RACH procedure is initiated or at any time point after the RACH is initiated.

In an exemplary embodiment, when the indication is to be transmitted, an uplink transmission can be initiated in a RRC_CONNECTED state. In this case, the indication can be transmitted together with data.

When multiplexing the consistent LBT failure indication for SDT with other messages into a MAC PDU, the logical channels shall be prioritised in accordance with specific priority rules. The priority of the consistent LBT failure indication for SDT can be configured or pre-defined. For example, the consistent LBT failure indication for SDT MAC CE and the consistent LBT failure indication for SDT signalling have the same priority. Furthermore, the consistent LBT failure indication for SDT has the same or lower priority with the consistent LBT failure MAC CE which is used in RRC_CONNECTED state.

When the terminal device 110 transitions from RRC_INACTIVE to RRC_CONNECTED state, the terminal device 110 performs a MAC Reset. The terminal device 110 shall not cancel or clear or suspend the triggered consistent LBT failure for SDT if the indication is not cancelled.

If the indication of one or more consistent LBT failure(s) is successful transmitted, the consistent LBT failure can be considered as eliminated. Thus, after the indication is transmitted, the terminal device 110 can cancel all detected consistent LBT failure(s). As another option, the terminal device can also cancel a portion of detected consistent LBT failure(s).

In an exemplary embodiment, the terminal device 110 can cancel all consistent LBT failures indicated in the indication after the indication is transmitted.

In an exemplary embodiment, in a case where terminal device 110 has detected a plurality of consistent LBT failures, the terminal device 110 can only cancel a portion of consistent LBT failures, which are triggered on the UL resources used for SDT, from the plurality of consistent LBT failures indicated in the indication after the indication is transmitted.

In an exemplary embodiment, in a case where terminal device 110 has detected a plurality of consistent LBT failures, the terminal device 110 can only cancel a portion of consistent LBT failures, which are triggered on the UL resources used for transmitting the indication, from the plurality of consistent LBT failures indicated in the indication after the indication is transmitted.

That is, if a MAC PDU is transmitted as SDT, for example in the UL resource(s) for SDT or following the SDT initialization condition, and LBT failure indication is not received from lower layers and this PDU includes the LBT failure indication for SDT, the terminal device 110 can cancel all the triggered consistent LBT failures for SDT in UL resource(s) for which consistent LBT failure was indicated in the transmitted LBT failure indication for SDT; or cancel all the triggered consistent LBT failures for SDT in the UL resource(s) for SDT: or cancel the triggered consistent LBT failure for SDT in the UL resource which is used to transmit the LBT failure indication.

If a MAC PDU is transmitted when the terminal device 110 is in RRC CONNECTED state and LBT failure indication is not received from lower layers and this PDU includes the LBT failure indication for SDT, the terminal device 110 can cancel all the triggered consistent LBT failure for SDT in UL resource(s) for which consistent LBT failure was indicated in the transmitted consistent LBT failure indication for SDT; or cancel all the triggered consistent LBT failure for SDT in the UL resource(s) for SDT; or cancel the triggered consistent LBT failure for SDT in the UL resource which is used to transmit the LBT failure indication.

In an exemplary embodiment, if the consistent LBT failures has been triggered in the first Band Width Part (BWP) and the indication is transmitted by the second BWP different from the first BWP, the terminal device 110 can cancel the consistent LBT failures after the indication is transmitted.

For example, if the terminal device 110 transitions from a RRC non-connected state to RRC_CONNECTED state on a new resource (another serving cell or BAT) and the indication of consistent LBT failure is transmitted on the new resource, the consistent LBT failure that has been triggered on an original BWP or serving cell for which the UL resource has been used for SDT can also be cancelled.

Referring back to FIG. 2, after receiving the indication from the terminal device 110, the network device 120 can identify resources the consistent LBT failures was triggered on and reconfigure 220 resources for the subsequent UL data transmission.

In the solution proposed in the present disclosure, the format and signaling of consistent LBT failure indication for data transmission in the RRC non-connected state is designed. The transmission of the indication can be performed in various state of the terminal device. Meanwhile, the scheme of the cancellation mechanisms for the triggered consistent LBT failure for SDT is also proposed.

Example Method

Figure 4:
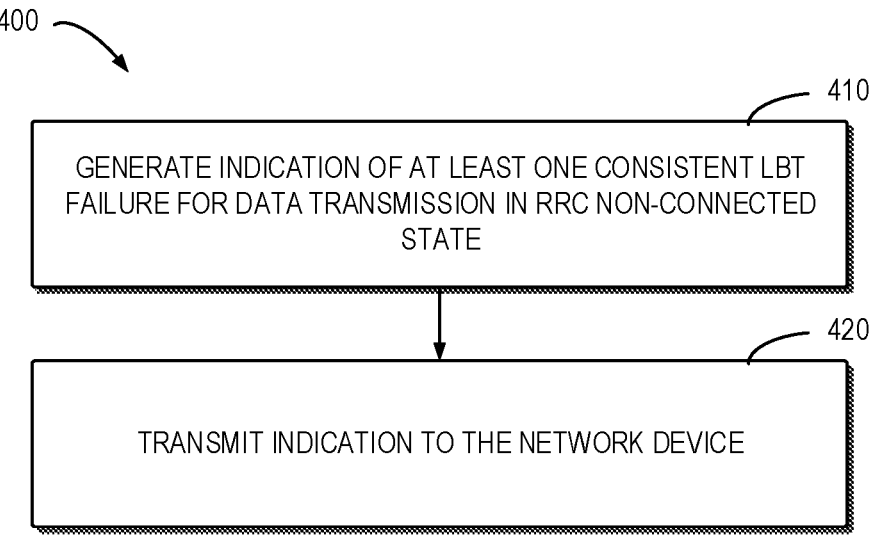
FIG. 4 illustrates a flowchart of an example method according to some embodiments of the present disclosure.

FIG. 4 illustrates a flowchart of an example method 400 according to some embodiments of the present disclosure. The method 400 can be performed by the terminal device 110 as shown in FIG. 1. It is to be understood that the method 400 may include additional blocks not shown and/or may omit some blocks as shown, and the scope of the present disclosure is not limited in this regard. For the purpose of discussion, the method 400 will be described from the perspective of the terminal device 110 with reference to FIG. 1.

If the terminal device 110 determines that at least one consistent LBT failure is triggered on a set of resources associated with a data transmission between a network device and the terminal device in RRC non-connected state, the terminal device 110, at block 410, generates an indication of the at least one consistent LBT failure for the data transmission in the RRC non-connected state.

In an exemplary embodiment, the terminal device 110 can determine, from the set of resources, a subset of resources for which the consistent LBT failure has been triggered and generate the indication indicating the subset of resources, wherein such subset of resources can consist of at least one resource for which the consistent LBT failure was triggered for.

In an exemplary embodiment, if the set of resources is being pre-configured by the network, the subset of resources can comprise at least one pre-configured resource for the data transmission in the RRC non-connected state. If the SDT is to be transmitted by a RACH procedure, the subset of resources can also comprise RACH occasion for the data transmission in the RRC non-connected state or an uplink channel for transmitting a message in the RACH procedure for the data transmission in the RRC non-connected state.

In an exemplary embodiment, the terminal device 110 can generate a signaling indicating that the at least one consistent LBT failure has been triggered on the set of resources.

At block 420, the terminal device 110 transmits the indication to the network device.

In an exemplary embodiment, the terminal device 110 can transmit the indication after the data transmission is initiated in a RRC_INACTIVE or RRC_IDLE state.

In an exemplary embodiment, the terminal device 110 can transmit the indication after a RACH procedure for the data transmission is initiated in a RRC_INACTIVE or RRC_IDLE state.

In an exemplary embodiment, the terminal device 110 can transmit the indication after an uplink transmission is initiated in a RRC_CONNECTED state.

In an exemplary embodiment, the terminal device 110 can transmit the indication via a RRC message.

In an exemplary embodiment, the terminal device 110 can transmit the indication together with data to be transmitted in RRC_INACTIVE OR RRC_IDLE state.

In an exemplary embodiment, the terminal device 110 can cancel the at least one consistent LBT failure after the indication has been transmitted.

In an exemplary embodiment, the indication of the at least one consistent LBT failure in a MAC CE or signaling format can indicate a plurality of triggered consistent LBT failures, the terminal device 110 can cancel a portion of consistent LBT failures in the plurality of triggered consistent LBT failures after the indication has been transmitted, the portion of consistent LBT failures being triggered on the set of resources associated with the data transmission in the RRC non-connected state.

In an exemplary embodiment, the indication of the at least one consistent LBT failure in a MAC CE or signaling format can indicate a plurality of triggered consistent LBT failures, the terminal device 110 can cancel a portion of consistent LBT failures in the plurality of triggered consistent LBT failures after the indication has been transmitted, the portion of consistent LBT failures being triggered on a further set of resources used for transmitting the indication In an exemplary embodiment, the indication of the at least one consistent LBT failure in a MAC CE or signaling format can indicate a plurality of triggered consistent LBT failures, the terminal device 110 can cancel a portion of consistent LBT failures in the plurality of triggered consistent LBT failures after the indication has been transmitted on a further set of resources used for transmitting the indication, the portion of consistent LBT failures being triggered on resources different from the further set of resources.

FIG. 5 illustrates a flowchart of an example method 500 according to some embodiments of the present disclosure. The method 500 can be performed by the first network device 120 as shown in FIG. 1. It is to be understood that the method 500 may include additional blocks not shown and/or may omit some blocks as shown, and the scope of the present disclosure is not limited in this regard. For the purpose of discussion, the method 500 will be described from the perspective of the network device 120 with reference to FIG. 1.

At block 510, the network device 120 receives, from a terminal device while in a RRC non-connected state, an indication of at least one consistent LBT failure for a data transmission between the terminal device 110 and the network device 120.

In an exemplary embodiment, the network device 120 can receive the indication via a RRC message.

In an exemplary embodiment, the network device 120 can receive the indication together with data transmitted by the terminal device 110 while in the RRC non-connected state.

At block 520, the network device 120 determines, based on the indication, additional resources to be allocated to the terminal device 110 for a further data transmission in the RRC non-connected state between the terminal device 110 and the network device 120.

Example Apparatus

FIG. 6 is a simplified block diagram of an apparatus 600 that is suitable for implementing embodiments of the present disclosure. The apparatus 600 can be considered as a further example implementation of the terminal device 110 or the network device 120 as shown in FIG. 1. Accordingly, the apparatus 600 can be implemented at or as at least a part of the terminal device 110 or the network device 120.

As shown, the apparatus 600 includes a processor 610, a memory 620 coupled to the processor 610, and a suitable transmitter (TX) and receiver (RX) 640 coupled to the processor 610. The memory 610 stores at least a part of a program 630. The TX/RX 640 is for bidirectional communications. The TX/RX 640 is coupled to at least one antenna to facilitate communication, though, in practice, an Access Node mentioned in this application may have several antennas. The processor 610 can be coupled to a communication interface (not shown). The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device.

A program 630 is assumed to include program instructions that, when executed by the associated processor 610, enable the apparatus 600 to operate in accordance with the embodiments of the present disclosure, as discussed herein with reference to FIGS. 2-5. The embodiments herein may be implemented by computer software executed by the processor 610 of the apparatus 600, or by other hardware, or by a combination of software and hardware. The processor 610 may be configured to implement various embodiments of the present disclosure. Furthermore, a combination of the processor 610 and memory 610 may form processing means 650 adapted to implement various embodiments of the present disclosure.

The memory 610 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 610 is shown in the apparatus 600, there may be several physically distinct memory modules in the apparatus 600. The processor 610 may be of any type suitable to the local technical network, and may include one or more of general purpose computers, special purpose computers, microprocessors, digital signal processors (DSPs) and processors based on multicore processor architecture, as non-limiting examples. The apparatus 600 may have multiple processors, such as an application specific integrated circuit chip that is slaved in time to a clock which synchronizes the main processor.

In an exemplary embodiment, an apparatus for performing the method 400 (for example, the terminal device 110) may comprise respective means for performing the corresponding steps in the method 400. These means may be implemented in any suitable manners. For example, it can be implemented by circuitry or software modules.

In an exemplary embodiment, the apparatus comprises means for determining whether at least one consistent Listen Before Talk (LBT) failure is triggered on a set of resources associated with a data transmission between a network device and the terminal device in Radio Resource Control, RRC, non-connected state; means for in accordance with a determination that at least one consistent LBT failure is triggered, generating an indication of the at least one consistent LBT failure for the data transmission in the RRC non-connected state; and means for transmitting the indication to the network device.

In an exemplary embodiment, the means for generating an indication can comprise means for determining, from the set of resources, a subset of resources on which the at least one consistent LBT failure is triggered; and means for generating the indication indicating the subset of resources.

In an exemplary embodiment, the means for determining the subset of resources can comprise means for determining at least one of the following: at least one pre-configured resource for the data transmission in the RRC non-connected state, at least one Random Access Channel (RACH) occasion for the data transmission in RRC the non-connected state, and an uplink channel for transmitting a message in a RACH procedure for the data transmission in the RRC non-connected state.

In an exemplary embodiment, the means for generating an indication can comprise means for generating a signaling indicating that the at least one consistent LBT failure is triggered on the set of resources.

In an exemplary embodiment, the means for transmitting the indication can comprise means for transmitting the indication after the data transmission is initiated in a RRC_I-NACTIVE or RRC_IDLE state.

In an exemplary embodiment, the means for transmitting the indication can comprise means for transmitting the indication after a RACH procedure for the data transmission is initiated in a RRC_INACTIVE or RRC_IDLE state.

In an exemplary embodiment, the means for transmitting the indication can comprise means for transmitting the indication after an uplink transmission is initiated in a RRC_CONNECTED state.

In an exemplary embodiment, the means for transmitting the indication can comprise means for transmitting the indication via a Radio Resource Control, RRC, message.

In an exemplary embodiment, the means for transmitting the indication can comprise means for transmitting the indication together with data to be transmitted in RRC_I-NACTIVE OR RRC_IDLE state.

In an exemplary embodiment, the apparatus can further comprise means for canceling the at least one consistent LBT failure after the indication has been transmitted. In an exemplary embodiment, the at least one consistent LBT failures comprises a plurality of consistent LBT failures, the apparatus can further comprise means for canceling a portion of consistent LBT failures in the plurality of consistent LBT failures after the indication has been transmitted, the portion of consistent LBT failures being triggered on the set of resources associated with the data transmission in the RRC non-connected state.

In an exemplary embodiment, the at least one consistent LBT failures comprises a plurality of consistent LBT failures, the apparatus can further comprise means for canceling a portion of consistent LBT failures in the plurality of consistent LBT failures after the indication has been transmitted, the portion of consistent LBT failures being triggered on a further set of resources used for transmitting the indication.

In an exemplary embodiment, the at least one consistent LBT failures comprises a plurality of consistent LBT failures, the apparatus can further comprise means for canceling a portion of consistent LBT failures in the plurality of consistent LBT failures after the indication has been transmitted on a further set of resources used for transmitting the indication, the portion of consistent LBT failures being triggered on resources different from the further set of resources.

In an exemplary embodiment, an apparatus for performing the method 500 (for example, the network device 120)

may comprise respective means for performing the corresponding steps in the method 500. These means may be implemented in any suitable manners. For example, it can be implemented by circuitry or software modules.

In an exemplary embodiment, the apparatus comprises means for receiving, from a terminal device in Radio Resource Control, RRC, non-connected state, an indication of at least one consistent Listen Before Talk. LBT, failure for a data transmission between the terminal device and the network device; and means for determining, based on the indication, resources to be allocated to the terminal device for a further data transmission in the RRC non-connected state between the terminal device and the network device.

In an exemplary embodiment, the means for receiving the indication can comprises means for receiving the indication via a Radio Resource Control, RRC, message.

In an exemplary embodiment, the means for receiving the indication can comprises means for receiving the indication together with data to be transmitted in the RRC non-connected state.

Example embodiments of the present disclosure provide a solution for indicating LBT failure.

In an exemplary embodiment, there is provided a method performed by a terminal device. The method comprises determining whether at least one consistent LBT failure is triggered on a set of resources associated with a data transmission between a network device and the terminal device in RRC non-connected state; in accordance with a determination that at least one consistent LBT failure is triggered, generating an indication of the at least one consistent LBT failure for the data transmission in the RRC non-connected state; and transmitting the indication to the network device.

In an exemplary embodiment, generating the indication comprises determining, from the set of resources, a subset of resources on which the at least one consistent LBT failure is triggered; and generating the indication indicating the subset of resources.

In an exemplary embodiment, determining the subset of resources comprises determining at least one of the following: at least one pre-configured resource for the data transmission in the RRC non-connected state, at least one RACH occasion for the data transmission in RRC the non-connected state, and an uplink channel for transmitting a message in a RACH procedure for the data transmission in the RRC non-connected state.

In an exemplary embodiment, generating the indication comprises generating a signaling indicating that the at least one consistent LBT failure is triggered on the set of resources.

In an exemplary embodiment, transmitting the indication comprises transmitting the indication after the data transmission is initiated in a RRC_INACTIVE or RRC_IDLE state.

In an exemplary embodiment, transmitting the indication comprises transmitting the indication after a RACH procedure for the data transmission is initiated in a RRC_INACTIVE or RRC_IDLE state.

In an exemplary embodiment, transmitting the indication comprises transmitting the indication after an uplink transmission is initiated in a RRC_CONNECTED state.

In an exemplary embodiment, transmitting the indication comprises transmitting the indication via a Radio Resource Control, RRC, message.

In an exemplary embodiment, transmitting the indication comprises transmitting the indication together with data to be transmitted in RRC_INACTIVE OR RRC_IDLE state.

In an exemplary embodiment, the method further comprising canceling the at least one consistent LBT failure after the indication has been transmitted.

In an exemplary embodiment, the at least one consistent LBT failures comprises a plurality of consistent LBT failures, the method further comprising canceling a portion of consistent LBT failures in the plurality of consistent LBT failures after the indication has been transmitted, the portion of consistent LBT failures being triggered on the set of resources associated with the data transmission in the RRC non-connected state.

In an exemplary embodiment, the at least one consistent LBT failures comprises a plurality of consistent LBT failures, the method further comprising canceling a portion of consistent LBT failures in the plurality of consistent LBT failures after the indication has been transmitted, the portion of consistent LBT failures being triggered on a further set of resources used for transmitting the indication.

In an exemplary embodiment, the at least one consistent LBT failures comprises a plurality of consistent LBT failures, the method further comprising canceling a portion of consistent LBT failures in the plurality of consistent LBT failures after the indication has been transmitted on a further set of resources used for transmitting the indication, the portion of consistent LBT failures being triggered on resources different from the further set of resources.

In an exemplary embodiment, there is provided a method performed by a network device. The method comprises receiving, from a terminal device in RRC non-connected state, an indication of at least one consistent LBT failure for a data transmission between the terminal device and the network device; and determining, based on the indication, resources to be allocated to the terminal device for a further data transmission in the RRC non-connected state between the terminal device and the network device.

In an exemplary embodiment, receiving the indication comprises receiving the indication via a Radio Resource Control, RRC, message.

In an exemplary embodiment, receiving the indication comprises receiving the indication together with data to be transmitted in the RRC non-connected state.

In an exemplary embodiment, there is provided an apparatus. The apparatus includes a processor; and a memory coupled to the processor and storing instructions thereon, the instructions, when executed by the processor, causing the apparatus to perform the method performed by a terminal device.

In an exemplary embodiment, there is provided an apparatus. The apparatus includes a processor; and a memory coupled to the processor and storing instructions thereon, the instructions, when executed by the processor, causing the apparatus to perform the method performed by a network device.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE) for wireless communication, comprising:
at least one memory; and
at least one processor coupled with the at least one memory and configured to cause the UE to:
determine whether at least one consistent Listen Before Talk (LBT) failure is triggered on a set of resources associated with a data transmission between a network device and the UE in a Radio Resource Control (RRC) non-connected state;
when at least one consistent LBT failure is triggered, generate an indication of the at least one consistent LBT failure for the data transmission in the RRC non-connected state; and
transmit, in the RRC non-connected state, the indication to the network device.

2. The UE of claim 1, wherein, to generate the indication, the at least one processor is configured to cause the UE to:
determine, from the set of resources, a subset of resources on which the at least one consistent LBT failure is triggered; and
generate the indication indicating the subset of resources.

3. The UE of claim 2, wherein, to determine the subset of resources, the at least one processor is configured to cause the UE to determine:
at least one pre-configured resource for the data transmission in the RRC non-connected state,
at least one Random Access Channel (RACH) occasion for the data transmission in the RRC non-connected state, and
an uplink channel for transmitting a message in a RACH procedure for the data transmission in the RRC non-connected state.

4. The UE of claim 1, wherein, to generate the indication, the at least one processor is configured to cause the UE to:
generate a signaling indicating that the at least one consistent LBT failure is triggered on the set of resources.

5. The UE of claim 1, wherein, to transmit the indication, the at least one processor is configured to cause the UE to:
transmit the indication after the data transmission is initiated in an RRC_INACTIVE or RRC_IDLE state.

6. The UE of claim 1, wherein, to transmit the indication, the at least one processor is configured to cause the UE to:
transmit the indication after a Random Access Channel (RACH) procedure for the data transmission is initiated in an RRC_INACTIVE or RRC_IDLE state.

7. The UE of claim 1, wherein, to transmit the indication, the at least one processor is configured to cause the UE to:
transmit the indication after an uplink transmission is initiated in an RRC_CONNECTED state.

8. The UE of claim 1, wherein, to transmit the indication, the at least one processor is configured to cause the UE to:
transmit the indication via an RRC message.

9. The UE of claim 1, wherein, to transmit the indication, the at least one processor is configured to cause the UE to:

transmit the indication together with data to be transmitted in an RRC_INACTIVE or an RRC_IDLE state.

10. The UE of claim 1, wherein the at least one processor is further configured to cause the UE to:
cancel the at least one consistent LBT failure after the indication has been transmitted.

11. The UE of claim 1, wherein the at least one consistent LBT failure comprises a plurality of consistent LBT failures, and wherein the at least one processor is further configured to cause the UE to:
cancel a portion of consistent LBT failures in the plurality of consistent LBT failures after the indication has been transmitted, wherein the portion of consistent LBT failures is triggered on the set of resources associated with the data transmission in the RRC non-connected state.

12. The UE of claim 1, wherein the at least one consistent LBT failure comprises a plurality of consistent LBT failures, and wherein the at least one processor is further configured to cause the UE to:
cancel a portion of consistent LBT failures in the plurality of consistent LBT failures after the indication has been transmitted, wherein the portion of consistent LBT failures is triggered on a further set of resources used for transmitting the indication.

13. The UE of claim 1, wherein the at least one consistent LBT failure comprises a plurality of consistent LBT failures, and wherein the at least one processor is further configured to cause the UE to:
cancel a portion of consistent LBT failures in the plurality of consistent LBT failures after the indication has been transmitted on a further set of resources used for transmitting the indication, wherein the portion of consistent LBT failures is triggered on resources different from the further set of resources.

14. A processor for wireless communication, comprising:
at least one memory; and
a controller coupled with the at least one memory and configured to cause the controller to:
determine whether at least one consistent Listen Before Talk (LBT) failure is triggered on a set of resources associated with a data transmission between a network device and the UE in Radio Resource Control (RRC) non-connected state;
when at least one consistent LBT failure is triggered, generate an indication of the at least one consistent LBT failure for the data transmission in the RRC non-connected state; and
transmit, in the RRC non-connected state, the indication to the network device.

15. The processor of claim 14, wherein, to generate the indication, the at least one processor is configured to cause the UE to:
determine, from the set of resources, a subset of resources on which the at least one consistent LBT failure is triggered; and
generate the indication indicating the subset of resources.

16. A method performed by a user equipment (UE), the method comprising:
determining whether at least one consistent Listen Before Talk (LBT) failure is triggered on a set of resources associated with a data transmission between a network device and the UE in Radio Resource Control (RRC) non-connected state;

at least one consistent LBT failure is triggered, generate an indication of the at least one consistent LBT failure for the data transmission in the RRC non-connected state; and transmitting, in the RRC non-connected state, the indication to the network device.

17. The method of claim 16, wherein generating the indication comprises:

determining, from the set of resources, a subset of resources on which the at least one consistent LBT failure is triggered; and generating the indication indicating the subset of resources.

18. A network device for wireless communication, comprising:

at least one memory; and at least one processor coupled with the at least one memory and configured to cause the network device to:

receive, from a user equipment (UE) in a Radio Resource Control (RRC) non-connected state, an indication of at least one consistent Listen Before Talk (LBT) failure for a data transmission between the UE and the network device; and determine, based on the indication, resources to be allocated to the UE for a further data transmission in the RRC non-connected state between the UE and the network device.

\* \* \* \* \*